Figure 1:
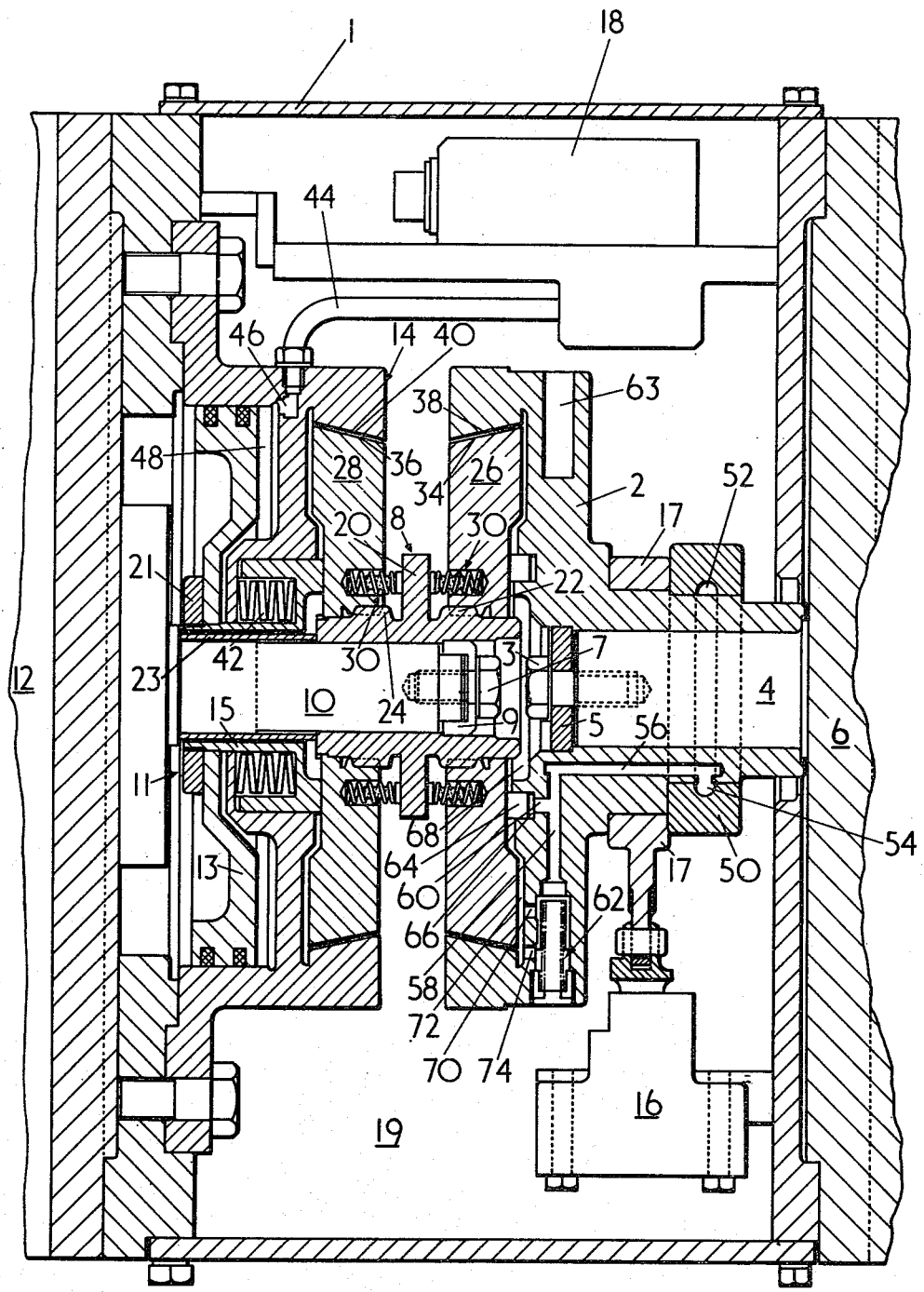

United States Patent [19]

Monks

[11] 4,175,649
[45] Nov. 27, 1979

[54] CONVEYOR DRIVES

[75] Inventor: Harry Monks, Burton-on-Trent, England

[73] Assignee: Coal Industry (Patents) Limited, London, England

[21] Appl. No.: 561,291

[22] Filed: Mar. 24, 1975

Related U.S. Application Data

[63] Continuation of Ser. No. 350,785, Apr. 13, 1973, abandoned.

[51] Int. Cl.² ............................................. F16D 67/04
[52] U.S. Cl. ................................. 192/18 A; 192/12 C
[58] Field of Search ................ 792/12 C, 18 A, 85 A, 792/109 F, 103 FA; 251/285

[56] References Cited

U.S. PATENT DOCUMENTS

| | | | |
|---|---|---|---|
| 2,191,320 | 2/1940 | Kessler | 192/12 C |
| 2,345,410 | 3/1944 | Mierley | 192/85 A X |
| 2,372,151 | 3/1945 | Whittaker | 192/85 A X |
| 3,511,469 | 5/1970 | Bell | 251/285 X |
| 3,529,705 | 9/1970 | Cudnohufsky | 192/12 C X |
| 3,667,583 | 6/1972 | Richards | 192/18 A X |
| 3,712,437 | 1/1973 | Snyder | 192/103 FA |

FOREIGN PATENT DOCUMENTS

| | | | |
|---|---|---|---|
| 653579 | 5/1951 | United Kingdom . | |
| 679555 | 9/1952 | United Kingdom . | |
| 696785 | 9/1953 | United Kingdom . | |
| 852648 | 10/1960 | United Kingdom | 192/18 A |
| 923781 | 4/1963 | United Kingdom | 192/18 A |
| 938536 | 10/1963 | United Kingdom . | |
| 944142 | 12/1963 | United Kingdom . | |
| 1019247 | 2/1966 | United Kingdom . | |
| 1313309 | 4/1973 | United Kingdom . | |

Primary Examiner—C. J. Husar
Assistant Examiner—Lance W. Chandler
Attorney, Agent, or Firm—Stevens, Davis, Miller & Mosher

[57] ABSTRACT

The drive mechanism is installed intermediate a motor and a conveyor drive and comprises a clutch arranged between the driving section and the driven section and a brake arranged to stop the driven section. A pump is drivably connected to the driven section and feeds fluid pressure via a relay control valve to actuate the clutch and the brake, the control valve ensuring that the clutch is not applied before the brake is released.

12 Claims, 2 Drawing Figures

CONVEYOR DRIVES

This is a continuation of application Ser. No. 350,785, filed Apr. 13, 1973.

This invention relates to conveyor drives and in particular to such drives for conveyors which are usually loaded or partially loaded when the drive motor is started. Under such conditions known conveyor drives have the disadvantage that the motor is liable to stall when switched on causing the motor to overheat and eventually burn out. Also the conveyor must be unloaded before the conveyor can be made to run.

A further disadvantage of known conveyor drives is that when the motor is switched off the conveyor does not stop immediately but because of the stored inertia of the moving parts, the conveyor continues to run for some time after. Such an occurrence can be very dangerous for workmen operating in the vicinity of the conveyor, especially if the conveyor is on a longwall face of an underground coal mine where it may not be possible for the workmen to move away from the conveyor. Conveyor drives have been proposed which include brakes but because of the large amount of inertia stored in the fast moving rotor of the motor, such drives have usually been found unsatifactory.

According to the present invention a drive mechanism for a convoyor comprises a driving stage adapted to rotate with a motor, a driven stage adapted to drive the conveyor and to be drivably connected to the driving stage by a clutch, a brake biassed to its applied position contacting the driven stage, characterised in that control means associated with pressure fluid from a pump drivably connected to the driving stage ensure that after the motor is started, the brake is moved to its released position before the clutch is engaged to drivably connect the driving and driven stages, the pressure fluid releasing the brake and engaging the clutch. Preferably, the control means also ensures that, when the driving force is removed, for example by the motor being switched off, the clutch is disengaged to disconnect the driving and driven stages before the brake is applied.

The control means may preferably include a solenoid valve.

The driving and driven stages may include two coaxial rotating shafts, of which one is in the driving stage and the other is in the driven stage, and of which one is hollow and the other is within the hollow shaft.

Figure 2:
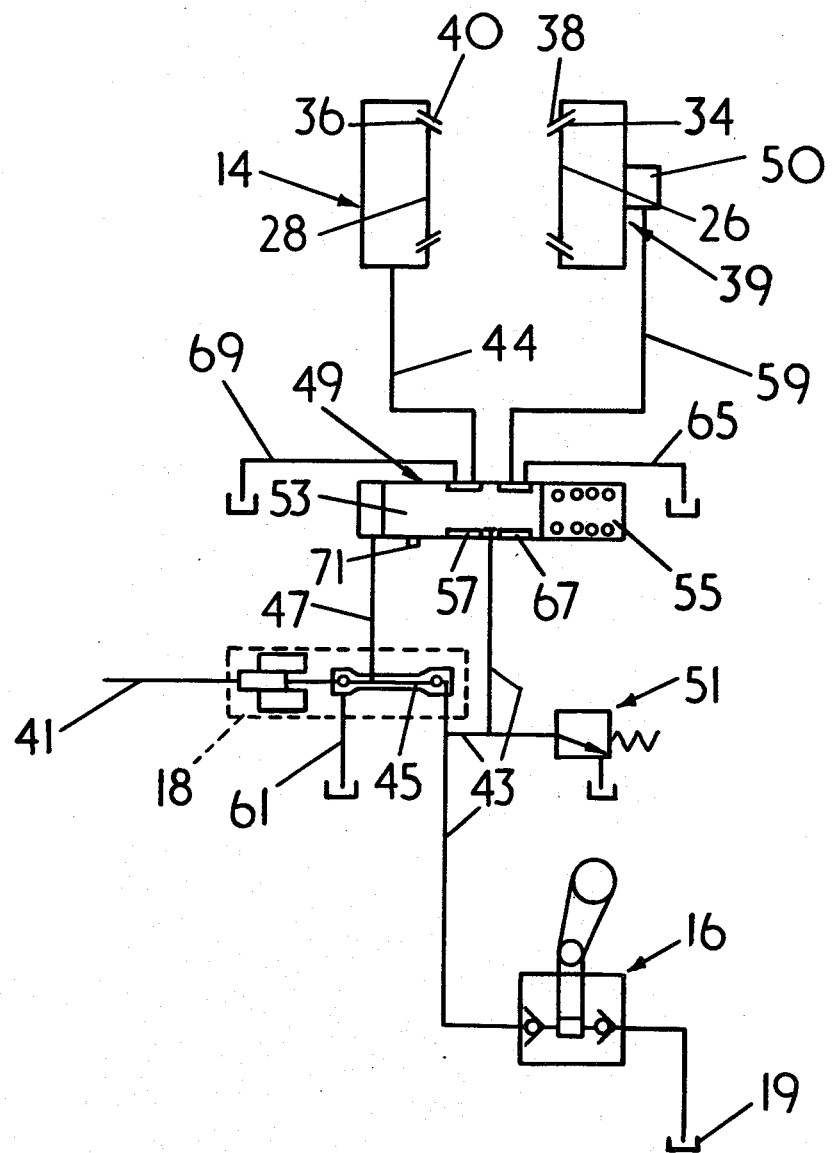

By way of example only, one embodiment of the invention will be described with reference to the accompanying drawings in which FIG. 1 is a sectional view of a conveyor drive constructed in accordance with the present invention; and FIG. 2 is a circuit diagram of a part of the conveyor drive of FIG. 1.

FIG. 1 of the drawing shows a drive for a longwall conveyor used in an underground coal mine. The drive comprises a casing 1 within which is a driving stage member 2 drivably mounted on the drive shaft 4 of an electric motor 6, and a driven stage 8, coaxial with the driving stage and drivably mounted on a driven shaft 10 of a gearbox 12 which in turn is drivably connected to a drive sprocket (not shown) of the conveyor. The member 2 is keyed onto the shaft 4 and is retained in position by a bolt 3 and washer 5. The driven stage 8 engages a spline on the shaft 10 and is retained in position by a bolt 7 and washer 9.

The drive also comprises a brake generally indicated by 14 fixedly mounted to the casing 1 and including a movable assembly generally indicated by 11 which comprises a piston 13 secured to a rod 15 by a nut 21 and which is slidable along a bush 23 on the shaft 10. A pump 16 for hydraulic fluid is secured to the casing 1 and is drivably connected to the member 2 through a collar 17 eccentrically mounted on the member. Hydraulic fluid is fed by the pump 16 from a sump 19 to a solenoid control valve 18 which feeds pressure fluid to the drive in a manner as described later.

The driven stage 8 comprises a central bush 20 having two splines 22 and 24 adjacent to its ends, and two opposed two splines 22 and 24 adjacent to its ends, and two opposed discs 26, 28 slidably mounted on the splines 22, 24 respectively. The two discs 26, 28 are urged apart by six pairs of coil springs 30 (only two pairs of which are shown) equally spaced around the discs.

The discs 26, 28 have frustro-conical outer surface edges 34, 36 arranged to contact corresponding surface edges 38, 40 on the member 2 and brake 14, respectively. The surface edges 34 and 38 constitute a clutch 39 and when they are in contact the driven stage 8 is drivably connected to the member 2 corresponding to the drive position and when the surface edges 36 and 40 are in contact the driven stage 8 is braked, corresponding to the applied position.

The movable assembly 11 of the brake 14 is urged by six disc springs 42 so as to contact the disc 28 which is thus moved against the action of the springs 30 into the applied position.

The member 2, the clutch 39 and the brake 14 are provided with bores and various hydraulically actuated devices which will be referred to during the description of the operation of the drive.

Other items for example the feed pipe from the pump 16 to the control valve 18 and details of the pump 16 and valve 18 have been omitted from FIG. 1 for the sake of clarity.

The operation of the conveyor drive will now be described particularly with reference to FIG. 2 of the drawings.

When the electric motor 6 is switched on the solenoid control valve 18 is simultaneously excited by an electric signal fed from the motor switch gear to the solenoid control valve 18 along line 41.

As the motor 6 rotates and gathers speed it drives the pump 16 via the rotating collar 17 so that pressure fluid is fed along pipe 43 to the solenoid control valve 18 which is open due to the electric signal fed along line 41 and which thereby allows the pressure fluid to flow through a small diameter bore 45 in the valve 18 into a pipe 47 interconnecting the solenoid valve 18 to a spring loaded relay control valve 49. The small diameter bore 45 forms a restrictor to the flow of fluid pressure through the valve 18 and thus the pressure of the fluid fed to the control valve 49 builds up relatively slowly ensuring that the motor 6 is running at full speed before the control valve 49 is activated. Excess pressure fluid in the pipe 43 is relieved through relief valve 51. Once the pressure fluid fed to the control valve 49 reaches a preselected value, the control valve is activated so that its spindle 53 moves against the action of the spring-loading due to coil spring 55. Upon the spindle 53 moving to the right as seen in FIG. 2, pressure fluid in the pipe 43 is passed via an elongated annular groove 57 formed in the spindle 53 to the brake 14 via pipe 44. The fluid passes through bore 46 into a chamber 48 where it urges the assembly 11 to slide along the shaft 10 against the action of the springs 42 and allows the disc 28 to slide along the spline 24 under the action of the springs 30 so that the surface edges 36 and 40 disengage, releasing the driven stage 8 from the brake 14.

By the time the brake 14 is released the spindle 53 has moved sufficiently to the right as seen in FIG. 2 against the action of the spring 55 so that the elongated annular groove 57 communicates with pipe 59 interconnecting the control valve 49 to the clutch 39. Thus, pressure fluid is fed from the pipe 43 via the annular groove 57 and pipe 59 to a stationary collar 50 (See FIG. 1) secured to the casing 1 and slidably mounted on the member 2. The time taken for the spindle 53 to move from the position in which pressure fluid was initially fed to the brake 14 to release the brake, to the position in which pressure fluid is initially fed to the clutch 39 to engage the clutch ensures that the brake is released before the clutch is applied.

The pressure fluid passes along a bore (not shown) in the collar 50 into an annular groove 52 formed around the inner periphery of the collar. From the groove 52 fluid is fed into bores 54, 56, 58 and 60 in the driving stage member 2. Fluid is fed along bore 58 to a valve 62 which is spring loaded into the closed position, and along bore 60 to a ring 64 slidable in a recess 66. The member 2 has a blind bore 63 to counter-balance the bores 54, 56, 58 and 60. The ring 64 is urged out of the recess 66 by the fluid pressure to contact the disc 26 which thus slides along the spline 22 against the action of the springs 30 until the surface edges 34 and 38 contact each other causing the driven stage 8 to start rotating and the conveyor to start running. At this point in time the surfaces edges 34, 38 of the clutch 39 are held in contact only by the force of the ring 64 and the pressure of a small amount of fluid which is allowed to leak past the ring 64 into chamber 68. Thus some slip occurs between the surface edges 34 and 38 and the conveyor is therefore started slowly.

As the fluid pressure in the bores 54, 56, 58 and 60 builds up the force holding the surface edges 34 and 38 in contact increases and less slip occurs and the conveyor's speed gradually increases.

When the fluid pressure reaches a certain preselected value, the spring loaded valve 62 is opened due to the pressure of the fluid in combination with the centrifugal force acting on the valve 62 as the member 2 rotates. When the valve 62 opens fluid is fed through bore 70 into an annular chamber 72 where the fluid pressure acts on the side of the disc 26, the surface edges 34, 38 of the clutch 39 being held in contact with a force sufficient to prevent slip occurring. The driven stage 8 is now rotating with a speed equal to that of the motor 6 and the conveyor is running at full speed.

When the electricity supply to the motor 6 is switched off off, the solenoid control valve 18 is simultaneously de-energized and cuts off the supply of pressure fluid to the pipe 47 and the control valve 49. The pressure of fluid in the bores 54, 56, 58 and 60 and in the chambers 68 and 72 falls due to leakage of fluid to the sump 19. Also, when solenoid control valve 18 is de-energized pressure fluid is exhausted from the pipe 47 through exhaust port 61 and the spindle 53 of the control valve 49 moves to the left as seen in FIG. 2 under the action of its spring-loading. As the spindle moves under its spring-loading, the elongated annular groove 57 disengages the pipe 59 which is then connected to exhaust via an exhaust port 65 and an elongated annular 67. Thus, the supply of pressure fluid is exhausted from the clutch 39.

As soon as the fluid pressure falls the valve 62 is moved under the action of its spring to the closed position allowing the remainder of the fluid in chamber 72 to be exhausted through bore 74 to the sump 19. The disc 26 slides along the spline 22 under the action of the springs 30, and the surface edges 34 and 38 disengage. The clutch 39 is now disengaged and the driven stage 8 and the motor 6 are now rotating independently of each other.

By the time the surface edges 34 and 38 of the clutch have disengaged the spindle 53 has moved further to the left as seen in FIG. 2 under the action of the spring 55 and the elongated annular groove 57 disengages the pressure fluid supply and the supply of pressure fluid from pipe 43 is cut off by the control valve 49. Slight further movement of the spindle 53 under the action of the spring 55, causes the elongated groove 57 to engage an exhaust port 69 and fluid pressure is exhausted from the brake 14 via the pipe 44 and the annular groove 57. As soon as the pressure of fluid in the chamber 48 falls due to leakage and/or exhaust the assembly 11 of the brake 14 is moved along the shaft 10 under the action of the springs 42 causing the disc 28 to move against the action of the springs 30 so that the surfaces edges 36 and 40 come into contact to apply the brake. The driven stage 8 and the conveyor which have only a relatively small stored inertia when running at full speed are quickly brought to rest. The motor 6 which when rotating at full speed has a relatively high stored inertia is allowed to rotate freely and to come to rest gradually.

It can be seen from the above description that the conveyor drive provides an arrangement where the electric motor is started and can be allowed to reach full speed before any load is applied to it. When full speed is achieved by the motor the brake is automatically released before the load is automatically gradually applied.

When the power supply to the motor is switched off, the fast moving, heavy motor is automatically disengaged from the rest of the conveyor before the brake is automatically applied. Thus the conveyor is very quickly brought to rest.

In use underground, it is common practice to employ two conveyor drive arrangements located at the ends of the conveyor, respectively. In order to facilitate correct setting up of both the drive mechanisms an adjustment device 71, is, if desired, provided on the control valve 49. Such an adjustment device comprises, for example, a screw-member (not shown) fixedly located in the housing of the control valve 49 and a longitudinal slot (not shown) formed in the spindle 53. During setting up or testing, the screw-member is screwed into the slot and, thereby movement of the spindle 53 against the action of of its spring loading is limited to a preselected amount depending upon the length of the slot in the spindle 53. With the adjustment device in its operational position, upon the motor 6 being started the spindle 53 is allowed to move against the action of its spring loading sufficiently for the brake 14 to be released but not sufficiently for the clutch 39 to be engaged. Thus although the brake 14 is released, the motor 6 is not drivably connected to the conveyor. With the drive mechanism in this condition the operators are free to set up or test the other drive mechanism at the opposite end of the face without interference from the first mentioned drive mechanism. Once one drive mechanism is functioning correctly the other drive mechanism is similarly set up or tested. When both drive mechanisms are functioning correctly the adjustment devices are moved to their non-operational positions and movement of the spindles 53 is not restricted.

In other embodiments of the invention the control valve 18 may be an hydraulically energized valve and the time delay device may not be necessary.

In modifications of the conveyor drive, the drive mechanism is adapted to connect an outer, hollow driving shaft i.e. the motor shaft with an inner driven shaft.

I claim:

1. A drive mechanism for a conveyor, comprising:
   (a) a driving stage;
   (b) a motor for driving said driving stage;
   (c) a driven stage to drive the conveyor;
   (d) a clutch for drivably engaging said driving stage to said driven stage, said clutch being biased to disengage said driving and driven stages;
   (e) a brake biased to contact said driven stage to brake the conveyor; and
   (f) means to prevent said motor from starting under load of the conveyor, including a pump connected to and driven by said driving stage for pumping fluid under pressure, and control means connected to said pump to deliver the fluid to said brake and said clutch to control said brake and said clutch, said control means including means to enable the fluid pressure to increase to release said brake from said driven stage before said clutch engages said driving stage with said driven stage after said motor has started and is running at substantially full speed.

2. A drive mechanism as claimed in claim 1 wherein said means to enable also enables said clutch to disengage said driving stage from said driven stage before said brake contacts said driven stage when said motor is turned off.

3. A drive mechanism as claimed in claim 1 in which said clutch includes a movable surface and a movable piston ring responsive to the fluid to contact and move said surface, said clutch being in engagement when the fluid has moved said piston ring to cause said surface to move a certain distance.

4. A drive mechanism according to claim 1 in which said control means includes a spring loaded valve responsive to the fluid to open when the fluid reaches a preselected pressure to enable the fluid to control said clutch.

5. A drive mechanism according to claim 2 wherein said driven stage includes a central bush, said brake includes a first disc coaxial with and movable along said bush, and said clutch includes a second disc coaxial with and movable along said bush, said brake and said clutch each having two opposed frusto-conical surfaces to perform a braking and clutch action, respectively, said first and second discs each having one of said frusto-conical surfaces.

6. A drive mechanism as claimed in claim 1 wherein said driving stage and said driven stage include two coaxial rotating shafts, one of said shafts being in said driving stage and the other of said shafts being in said driven stage.

7. A drive mechanism as claimed in claim 1 further comprising a collar which is mounted eccentrically on said driving stage, said collar drivably connecting said pump to said driving stage.

8. A drive mechanism for a conveyor, comprising:
   (a) a driving stage;
   (b) a motor for driving said driving stage;
   (c) a driven stage to drive the conveyor;
   (d) a clutch for drivably engaging said driving stage to said driven stage, said clutch being biased to disengage said driving and driven stages;
   (e) a brake biased to contact said driven stage to brake the conveyor; and
   (f) means to prevent said motor from starting under load of the conveyor, including a pump connected to and driven by said driving stage for pumping fluid under pressure, and control means connected to said pump to deliver the fluid to said brake and said clutch to control said brake and said clutch, said control means including a first solenoid control valve through which fluid flows from said pump when said first valve is energized, a second relay control valve connected to said first valve and said pump, said second valve being activated by fluid from said first valve to pass fluid from said pump to said brake and said clutch, said first valve including a flow restrictor through which the fluid flows to increase slowly the pressure of fluid to said second valve before said second valve is activated to pass fluid to said brake and said clutch, said second valve having means to ensure that after said motor is started and running at substantially full speed, the fluid pressure from said pump increases so that said brake releases said driven stage before said clutch engages said driving stage with said driven stage.

9. A drive mechanism as claimed in claim 8 wherein said flow restrictor includes a small diameter bore.

10. A drive mechanism as claimed in claim 9 wherein said means to ensure includes a spring loaded spindle movable by the fluid from said first valve, said spindle including an elongated annular groove to pass the fluid from said pump.

11. A drive mechanism as claimed in claim 10 wherein said second valve includes an adjustment device for selectively limiting movement of said spindle against its spring loading.

12. A drive mechanism as claimed in claim 8 wherein said means to ensure includes means to deliver fluid from said pump first to said brake and to deliver fluid from said pump to said clutch subsequent to the delivery of fluid to said brake.

* * * * *